C. A. MOORE.
VENTILATING SYSTEM FOR CARS.
APPLICATION FILED MAR. 23, 1914. RENEWED DEC. 28, 1916.
1,308,188.
Patented July 1, 1919.
2 SHEETS—SHEET 1.
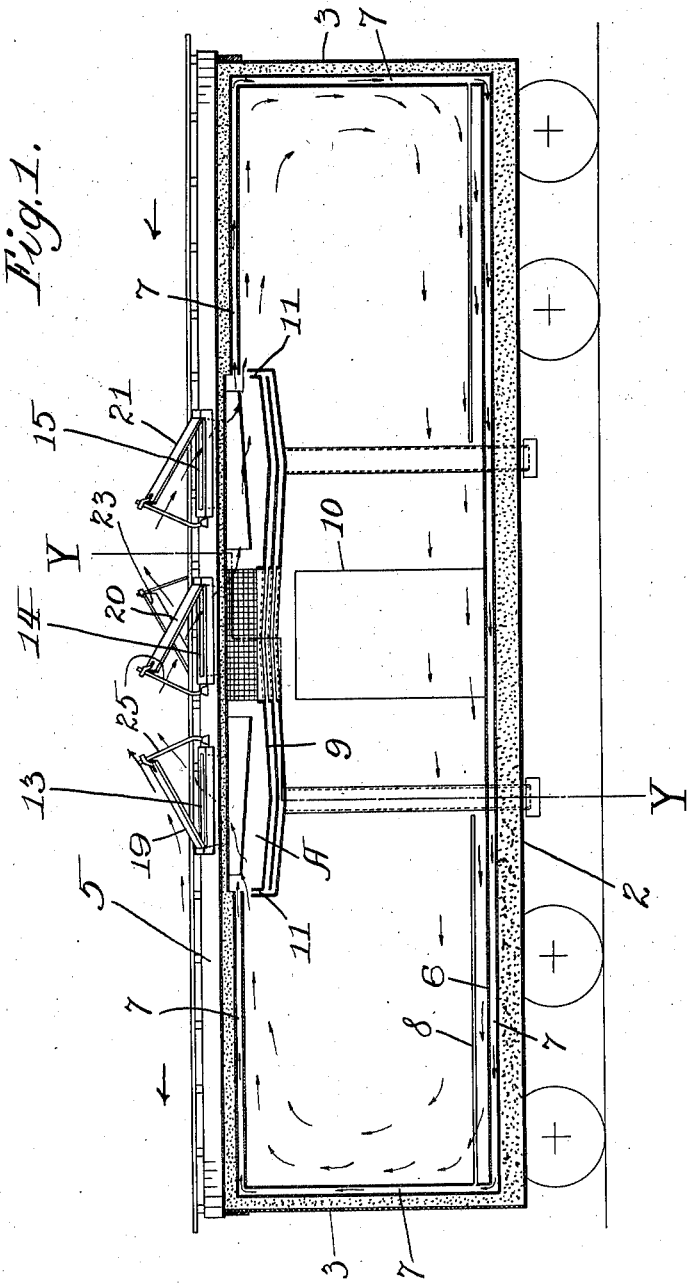

C. A. MOORE.
VENTILATING SYSTEM FOR CARS.
APPLICATION FILED MAR. 23, 1914. RENEWED DEC. 28, 1916.
1,308,188.
Patented July 1, 1919.
2 SHEETS—SHEET 2.
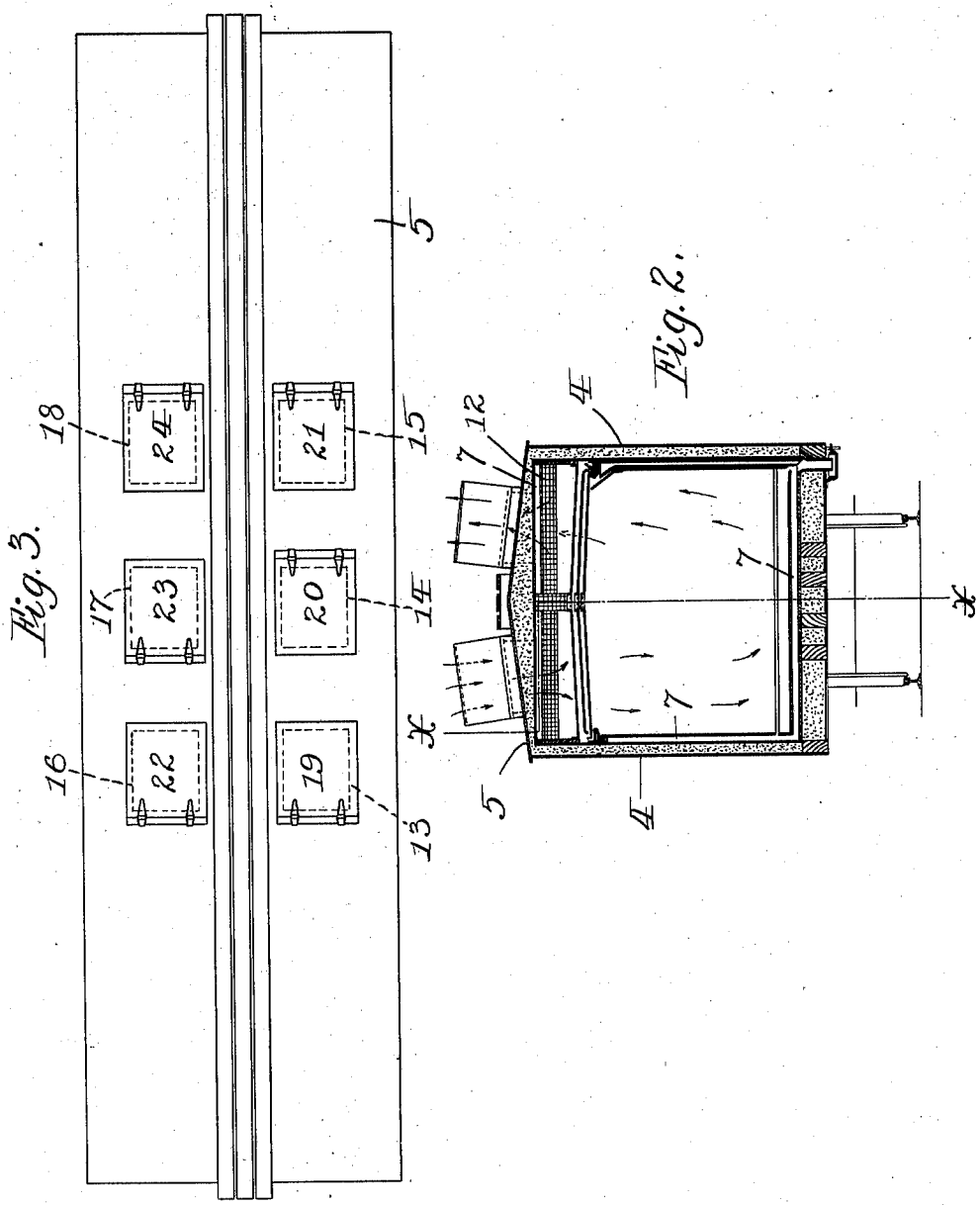

UNITED STATES PATENT OFFICE.

CHARLES A. MOORE, OF ST. PAUL, MINNESOTA.

VENTILATING SYSTEM FOR CARS.

1,308,188.             Specification of Letters Patent.      Patented July 1, 1919.

Application filed March 23, 1914, Serial No. 826,780. Renewed December 28, 1916. Serial No. 139,405.

*To all whom it may concern:*

Be it known that I, CHARLES A. MOORE, a citizen of the United States, residing at St. Paul, in the county of Ramsey and State of Minnesota, have invented a new and useful Improvement in Ventilating Systems for Cars, of which the following is a specification.

My invention relates to improvements in ventilated cars for use in the transportation of perishable goods, such as fruit, vegetables and other commodities. More particularly this invention relates to improved means for more sharply defining the circulation of air throughout the entire lading chamber and walls of the car so as to more completely expel vitiated air and keep the contents of the car cool and free from moisture. Among further objects of my invention is the construction of a car which is simple, inexpensive, strong and durable and which will provide a maximum lading space. The subject matter of this application is an improvement upon the construction set forth in my companion application filed March 14, 1912, bearing Serial Number 683,682.

In the accompanying drawings forming part of this specification, Figure 1 is a longitudinal vertical section taken upon the line X—X of Fig. 2; Fig. 2 is a cross section taken upon the line Y—Y of Fig. 1, and Fig. 3 is a plan.

The car body illustrated by the drawings is of ordinary design, being formed by outer inclosing walls, 2 representing the floor, 3—3 the ends, 4—4 the sides and 5 the roof. These walls may be constructed of wood, metal or of other suitable material mounted upon suitable frame supports in the usual manner. Inside these walls is a lining 6, which is distanced from the outer walls of the car, thus forming an enveloping space 7 through which a current of air is free to pass for assisting in ventilating and preserving the lading in the car. Suitable ports 8 are provided in the sides and ends near the floor of the car for the ingress and egress of air. In the top of the car is an ice bunker A having a floor 9 positioned above the doorway 10 in each side and ends 11 having openings closed by gratings 12 distanced remotely from the ends of the car. The passage 7 enveloping the lading chamber opens into each end of the bunker adjacent its ends and air is free to pass from the passage 7 and lading chamber into the bunker or vice versa from the bunker into the passage 7 and lading chamber. The roof of the car is provided with a plurality of hatchways 13, 14, 15, 16, 17 and 18 entering the bunker near each side of the car, said hatchways being remote from the ends of the car and closed by doors 19, 20, 21, 22, 23 and 24, which are hinged to the roof of the car and adapted to be supported partly open and inclined up from the roof by means of props 25 or other suitable supporting and fastening devices. There are six doors and hatchways illustrated, three on each side of the center line of the car over the bunker, two of the doors being hinged to open in one direction and the remaining door in the opposite direction on one side of the car. This order of arrangement is reversed on the other side. The angle of inclination of these doors when open and this arrangement are such that two of the doors such as 20 and 21 on one side of the car when the car moves in the direction of the arrows indicated in Fig. 1, act as scoops and direct air down into the car and the remaining door 19 on said side and one 23 on the other side act simultaneously as cowls, to prevent air entering the car through their corresponding hatchways and to deliver air out of the car. The direction of this circulation as described is reversed when the car is moving in the opposite direction. The floor 9 of the bunker below the hatchways acts as a deflector to assist in directing the circulation of air downwardly through the hatchways and into the upper portion of one end of the car and into the passage 7, thus causing a current of air to pass downwardly along an end wall of the car and forwardly along the floor, thence up and backwardly along the ceiling into the opposite end of the bunker and out through the hatchways 13 and 17. A portion of the air which is forced down through the passage 7 is free to pass into the lading chamber near the floor of the car through the ports 8 and vice versa some of the air admitted into the lading chamber is free to pass through the ports 8 into the passage 7 and out through the hatchways 13 and 17.

This circulation of air through the walls and the lading contained in the car removes vitiated air from the car and serves to evaporate moisture in the walls and cool the contents of the lading chamber. Complete and thorough ventilation is thus produced, which is advantageous. It is obvious that the car may be variously modified within the spirit of my invention, the bunker floor 9 being only one mode of constructing the means for directing the current of air directly toward an end of the car instead of downwardly which to some degree is produced when the deflector such as said floor is not employed below the air entering passages.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. A car body inclosing a lading chamber, said body being provided with an air inlet and an air outlet spaced apart in its upper portion near median position between the ends of said body, and an overhead chamber below and into which air is admitted by said inlet and from which air is conducted through said outlet, said chamber having end openings and its floor acting as a deflector in conjunction with said openings whereby air entering said chamber through said inlet is forced by the forward movement of the car, longitudinally from said chamber toward the rear end in said car, then downwardly, then forwardly over the floor of the car, then upwardly near the forward end of the car, then back along the forward upper portion in the car into said chamber and finally expelled through said outlet to the outer atmosphere.

2. A car body inclosing a lading chamber, said body being provided with an air inlet and an air outlet spaced apart and located near the median portion of the upper part between the ends of said body, an overhead ice bunker placed below said inlet and outlet having open ends forming a communication between the bunker and lading chambers, a cover over said inlet slanted forwardly to act as an air scoop during the forward movement of the car, and a cover over said outlet slanted rearwardly to act as an air cowl and protect said outlet from inward draft said inlet and outlet being so spaced apart as to cause air during the forward movement of the car to pass through said inlet into said bunker and out of said outlet from said bunker, the floor of said bunker being arranged to deflect the ingress of air in a well defined current longitudinally, said longitudinal current of air being diverted downwardly at the rear end of said lading chamber, then forwardly over the floor of the car, then upwardly at the forward end of said lading chamber, then backwardly along the forward upper portion of the lading chamber into said bunker and finally expelled through said outlet to the outer atmosphere.

In testimony whereof, I have signed my name to this specification, in the presence of two subscribing witnesses.

CHARLES A. MOORE.

Witnesses:
STELLA L. WASCHENBERGER,
F. G. BRADBURY.